(12) United States Patent
Liu et al.

(10) Patent No.: US 11,437,168 B1
(45) Date of Patent: Sep. 6, 2022

(54) CHARGING CABLE

(71) Applicant: SHENZHEN SHANQIRUI TECHNOLOGY CO., LTD, Shenzhen (CN)

(72) Inventors: Donggen Liu, Fengcheng (CN); Suqi Cao, Shenzhen (CN)

(73) Assignee: SHENZHEN SHANQIRUI TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/678,161

(22) Filed: Feb. 23, 2022

(51) Int. Cl.
| | |
|---|---|
| *H01R 9/00* | (2006.01) |
| *H01B 9/00* | (2006.01) |
| *H01R 13/66* | (2006.01) |
| *H01R 13/717* | (2006.01) |
| *H01R 13/516* | (2006.01) |
| *H01R 35/04* | (2006.01) |
| *F21V 23/04* | (2006.01) |
| *F21V 8/00* | (2006.01) |
| *F21V 1/00* | (2006.01) |
| *F21Y 115/10* | (2016.01) |

(52) U.S. Cl.
CPC .......... *H01B 9/005* (2013.01); *F21V 23/04* (2013.01); *G02B 6/0006* (2013.01); *H01R 13/516* (2013.01); *H01R 13/665* (2013.01); *H01R 13/7172* (2013.01); *H01R 13/7175* (2013.01); *H01R 35/04* (2013.01); *F21V 1/00* (2013.01); *F21Y 2115/10* (2016.08)

(58) Field of Classification Search
CPC .... H01B 9/005; H01R 13/516; H01R 13/665; H01R 13/7172; H01R 13/7175; H01R 35/04; H01R 13/717; F21V 23/04; F21V 1/00; F21V 2115/10; G02B 6/0006
See application file for complete search history.

(56) References Cited

U.S. PATENT DOCUMENTS

| | | | | |
|---|---|---|---|---|
| 7,121,707 | B2 * | 10/2006 | Currie | H01R 13/7172 |
| | | | | 362/555 |
| 8,167,471 | B1 * | 5/2012 | Moritz | G02B 6/001 |
| | | | | 362/582 |
| 9,620,913 | B2 * | 4/2017 | Wang | H01R 27/02 |
| 10,153,599 | B1 * | 12/2018 | Lin | H01R 13/7175 |
| 2004/0071410 | A1 * | 4/2004 | Ma | H01R 13/6641 |
| | | | | 385/88 |
| 2017/0310060 | A1 * | 10/2017 | Cote | H01R 13/7175 |

FOREIGN PATENT DOCUMENTS

| | | | |
|---|---|---|---|
| KR | 20150033361 A | * | 4/2018 |
| TW | M545379 U | * | 11/2017 |

* cited by examiner

*Primary Examiner* — Travis S Chambers
(74) *Attorney, Agent, or Firm* — Li & Cai Intellectual Property (USA) Office

(57) ABSTRACT

A charging cable is related to the data transmission technology field, including: a data cable main body, a data connector and a power connector. The data cable main body includes: a wire sleeve and a signal and power line. The power connector includes a USB interface, a first circuit board and a first casing. The charging cable further includes: at least one LED lamp bead; at least one lampshade that is opaque, and a transparent optical fiber and a control switch for controlling the LED lamp bead.

11 Claims, 4 Drawing Sheets

CHARGING CABLE

FIELD OF THE DISCLOSURE

The present disclosure relates to the data transmission technology field, in particular, to a charging cable.

BACKGROUND OF THE DISCLOSURE

At present, during the use of electronic devices such as mobile phones and power banks, a data charging cable needs to be connected for charging and data transmission. The current data cable with light indication still has the following problems. First, the indicator lights are generally designed on the plugs at both ends, and the brightness of the indicator lights is small, and it is easy to be covered in actual use, resulting in still invisible, so it needs to be improved.

SUMMARY OF THE DISCLOSURE

The purpose of the present disclosure is to aim at the defects and deficiencies of the prior art, to provide a charging cable, which solves the problem that the charging cable is connected to the power source and the data connector is not easy to find in a dark environment, and has the advantage that the lighting effect of the LED light can be switched by controlling the switch, and the aesthetic line and atmosphere effect of the charging cable are increased.

The purpose of the present disclosure is to address the defects and deficiencies of the prior art, and provides a charging cable, including: a data cable main body, a data connector and a power connector respectively disposed at two ends of the data cable main body, wherein the data cable main body includes: a wire sleeve and a signal and power line of which two ends are electrically and respectively connected to the data connector and the power connector, wherein the power connector includes a USB interface, a first circuit board and a first casing, the signal and power line is electrically connected to the USB interface through the first circuit board, and wherein the first casing is a light-transmitting casing, the wire sleeve is a transparent wire sleeve, and the charging cable further includes: at least one LED lamp bead disposed in the first casing and electrically connected to the first circuit board; at least one lampshade that is opaque, being sleeved on an outer side wall of the LED lamp bead and located in the first casing; a transparent optical fiber, one end of which passes through the lampshade and is butted with the LED lamp bead, wherein the transparent optical fiber is disposed in the wire sleeve and extends from one end of the wire sleeve to another end of the wire sleeve; and a control switch for controlling the LED lamp bead, the control switch passing through one side of the first casing and being electrically connected to the first circuit board.

A number of LED lamp beads is three, and the three LED lamp beads are disposed in parallel on one end of the first circuit board away from the USB interface; a number of the lampshade is one, and three light-shielding grooves each adapted to the LED lamp bead are disposed in parallel on the lampshade; a number of the transparent optical fibers is three, and the three transparent optical fibers and the signal and power line are helically wound to each other in the wire sleeve.

An anti-shrinkage structure is disposed on one end of the first casing close to the data cable main body for preventing the first casing from shrinking and causing the first casing to loosen from the data cable main body.

The anti-shrinkage structure has a plurality of through holes and/or grooves disposed on upper and lower sides of the one end of the first casing close to the data line body.

The data connector includes: a second casing that is light-transmitting; a second circuit board disposed in the second casing and electrically connected to an end of the signal and power line away from the power connector; and an external connector electrically connected to the second circuit board.

A display light electrically connected to the second circuit board is disposed in the second casing.

One end of the second casing is provided with a slot, a part of the second circuit board is exposed in the slot, and two metal conductive sheets correspondingly and electrically connected to the second circuit board are respectively provided on two sides of the part of the second circuit board that is exposed in the slot; wherein the external connector is rotatably disposed inside the slot through an insulated rotating shaft, two conductive elastic sheets respectively abutting against the two metal conductive sheets and rotatably disposed on the rotating shaft are disposed on the external connector; wherein the external connector includes: a conductive connector and a USB connector, the conductive connector is electrically connected to one end of each of the two conductive elastic sheets, and the USB connector magnetically and electrically connected to the conductive connector is used for plugging with a device charging port.

The external connector is a USB connector, and the external connector and the second casing form a 1-shape or a 7-shape.

Each of the first casing and the second casing is sleeved with an aluminum casing, and the control switch is a touch switch, a touch switch or a toggle switch.

The three LED lamp beads emit same light and have a color, or the three LED lamp beads emit different light.

After the above technical solution is adopted, the beneficial effects of the present disclosure are as follows. A charging cable, which is an automatic power-off data cable in the prior art, comprising: a data cable main body, a data connector and a power connector respectively disposed at tow ends of the data cable main body, the power connector includes a USB interface, a first circuit board and a first casing, and the signal and power line is electrically connected to the USB interface through the first circuit board to embody the basic function of the data line, and at the same time achieve the automatic power-off when the external device is fully charged. As a result, the first casing is a light-transmitting casing, the wire sleeve is a transparent wire sleeve, and the charging cable further includes: LED lamp beads, an opaque lampshade, a transparent optical fiber and a control switch. The user can control the LED lamp bead to emit light or extinguish it through the control switch. By adding LED lamp bead and transparent optical fiber, when the lamp bead is working, it can increase the aesthetics and interest of the data cable, improve the atmosphere effect in the dark environment, and at the same time the user can quickly find the data connector in the dark environment, so as to facilitate the user to charge.

A single-chip microcomputer is arranged on the first circuit board, and the control switch, the USB interface, the LED lamp beads, and the signal and power line are all electrically connected to the single-chip microcomputer through the first circuit board. The microcontroller can control the three LED lamp beads to turn on and off in turn according to the number of pressings of the control switch, or control the three LED lamp beads to flash at the same time, or control the three LED lamp beads to be always on, or control the three LED lamp beads to be in an off state, thereby embodying the beauty and fun of the charging cable.

BRIEF DESCRIPTION OF THE DRAWINGS

In order to explain the embodiments of the present disclosure or the technical solutions in the prior art more clearly, the following briefly introduces the accompanying drawings that need to be used in the description of the embodiments or the prior art. Obviously, the accompanying drawings in the following description are only some embodiments of the present disclosure, and for those of ordinary skill in the art, other drawings can also be obtained from these drawings without any creative effort.

Figure 1:
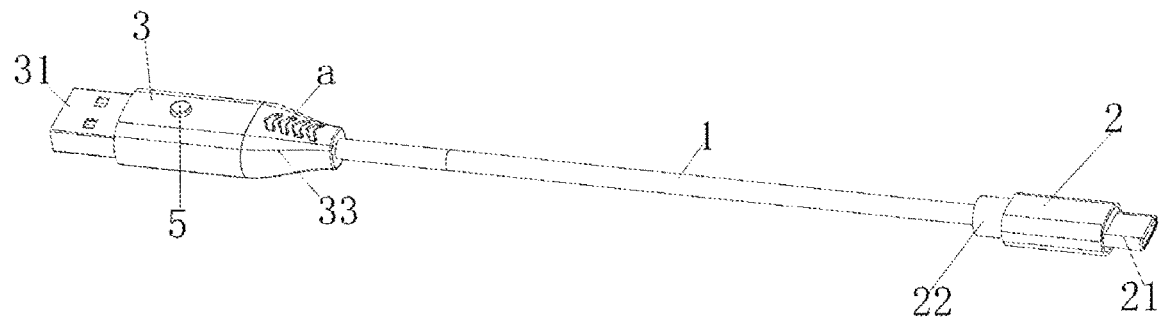
FIG. 1 is a schematic structural diagram illustrating that the connector of the data connector of the present invention is Type-C.

REFERENCE NUMERAL 1. data cable main body; 11. transparent optical fiber; 12. wire sleeve; 2. data connector; 21. external connector; 211. USB connector; 212, conductive connector; 213. conductive elastic sheet; 214. rotating shaft; 22. second casing; 23. second circuit board; 3. power connector; 31. USB interface; 32. first circuit board; 33. first casing; 34. LED lamp bead; 35. lampshade; 4. aluminum casing; 5. control switch; 51. touch and push switch; 52. toggle switch; 53. touch switch; a. anti-shrinkage structure; b. slot.

DETAILED DESCRIPTION OF THE EXEMPLARY EMBODIMENTS

The present disclosure will be further described in detail below with reference to the accompanying drawings.

This specific embodiment is only an explanation of the present disclosure, and it is not a limitation of the present disclosure. Those skilled in the art may, after reading this specification, make modifications to this embodiment without creative contribution as required, but as long as they are within the scope of the claims of the present disclosure, they are protected by the patent law.

Figure 2:
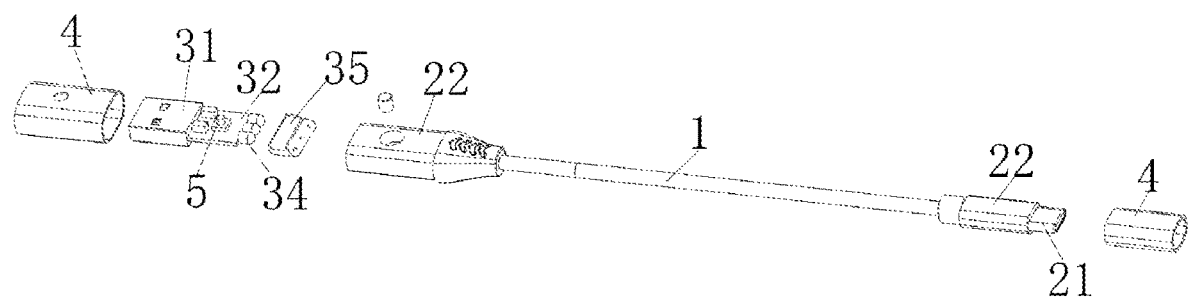
FIG. 2 is an explosion schematic diagram corresponding to FIG. 1.

This embodiment relates to a charging cable, which is an automatic power-off data cable in the prior art. As shown in FIGS. 1 and 2, the charging cable includes a data cable main body 1 and a data connector 2 respectively disposed at two ends of the data cable main body 1. The data cable main body 1 includes: a wire sleeve 12 and a signal and power line whose two ends are electrically connected to the data connector 2 and the power connector 3 respectively. The power connector 3 includes a USB interface 31, a first circuit board 32 and a first casing 33. The signal and power line is electrically connected to the USB interface 31 through the first circuit board 32 to realize the basic function of the data line, and at the same time achieve the effect of automatic power-off when the external device is fully charged, thereby avoiding overcharging of the device. The intelligent power-off module of the electrical data cable is arranged and integrated on the first circuit board 32 for connecting the power connector 3 and the data connector 2.

Figure 3:
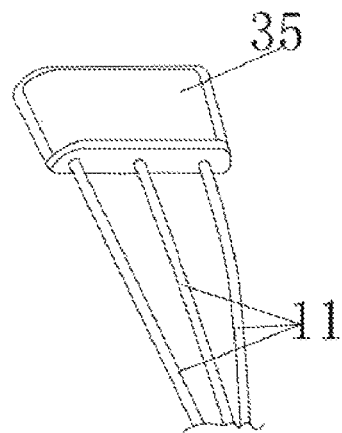
FIG. 3 is a schematic structural diagram of a combination of a transparent optical fiber and a lampshade.
Figure 4:
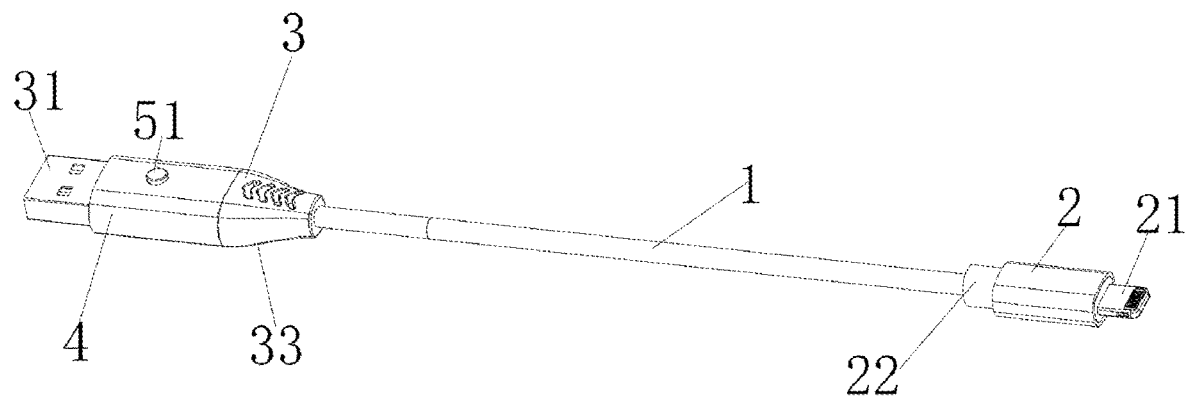
FIG. 4 is a schematic diagram illustrating that the connector of the data connector of the present disclosure is Lightning.
Figure 5:
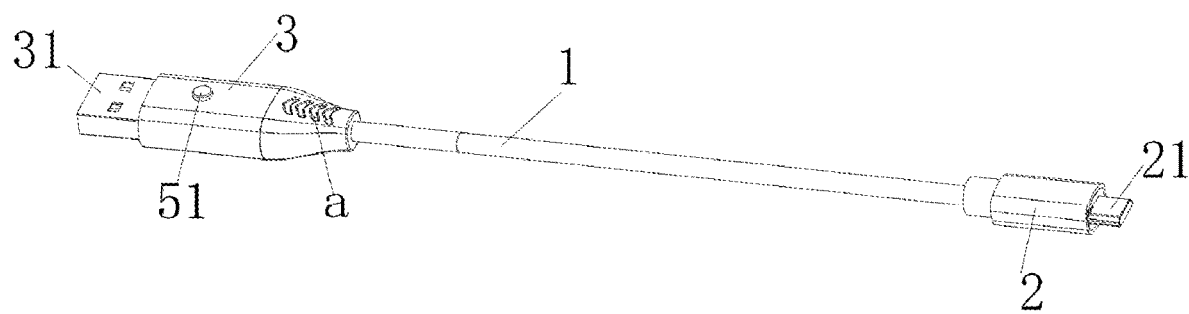
FIG. 5 is a schematic structural diagram of the data connector of the present disclosure where the connector is Micro USB and the control switch is a touch and push switch.

Specifically, as shown in FIGS. 2 and 3, the first casing 33 is a light-transmitting casing, the wire sleeve 12 is a transparent wire sleeve 12, and the charging cable further includes: at least one LED lamp bead 34, an opaque lampshade 35, a transparent optical fiber 11, and control switch 5.

The LED lamp bead 34 is disposed in the first casing 33 and electrically connected to the first circuit board 32; the opaque lampshade 35 is sleeved on an outer side wall of the LED lamp bead 34 and located in the first casing 33; and one end of the transparent optical fiber 11 passes through the lampshade 35 and is butted with the LED lamp bead 34. The transparent optical fiber 11 is disposed in the wire sleeve 12 and extends from one end of the wire sleeve 12 to another end of the wire sleeve 12; and the control switch 5 for controlling the LED lamp bead 34 passes through one side of the first casing 33 and is electrically connected to the first circuit board 32. The user can control the LED lamp bead 34 to emit light or turn it off through the control switch 5. By adding the LED lamp bead 34 and the transparent optical fiber 11, when the lamp bead is working, it can increase the aesthetics of the data line, and at the same time, at the same time the user can quickly find the data connector 2 in the dark environment, so as to facilitate the user to charge.

Figure 6:
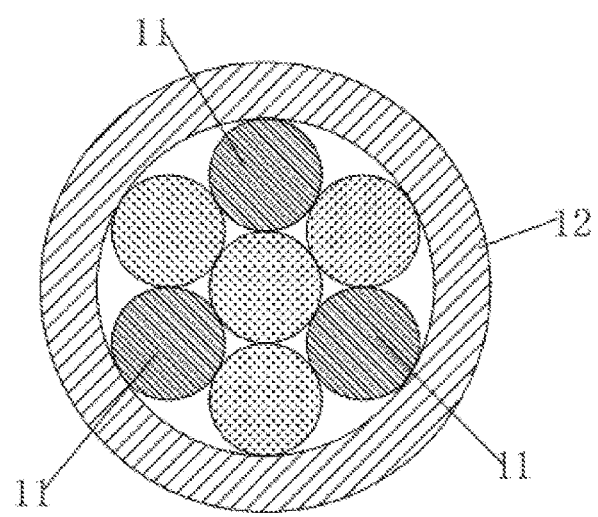
FIG. 6 is a cross-sectional view of a data line main body.
Figure 7:
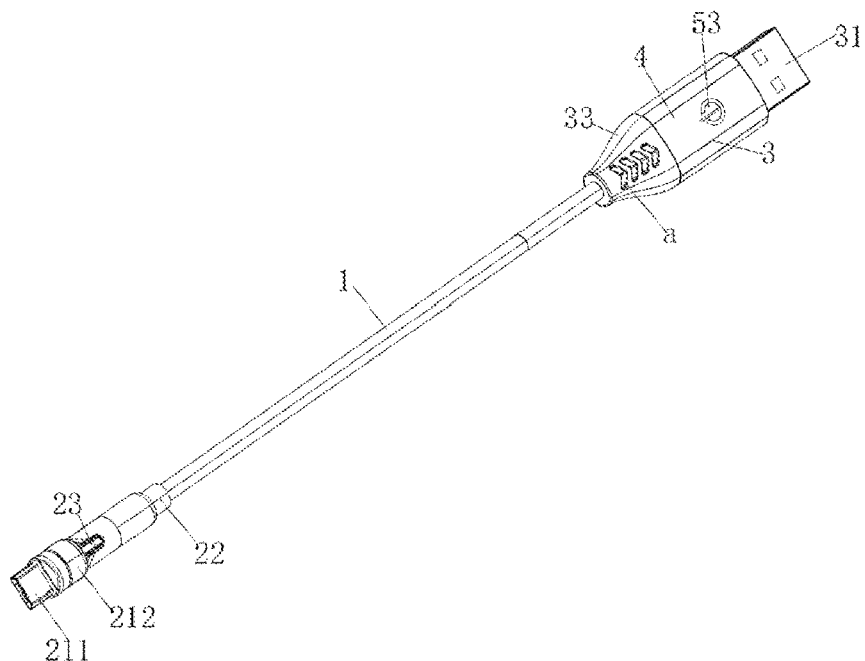
FIG. 7 is a schematic structural diagram in which the control switch of the present disclosure is a touch switch.
Figure 8:
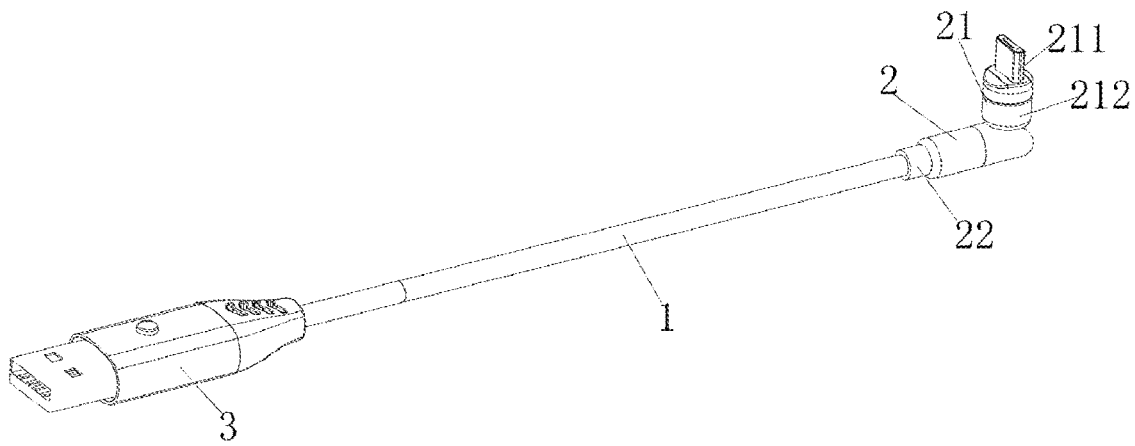
FIG. 8 is a schematic structural diagram of the conductive connector of the present disclosure and the first casing being in a vertical state.
Figure 9:
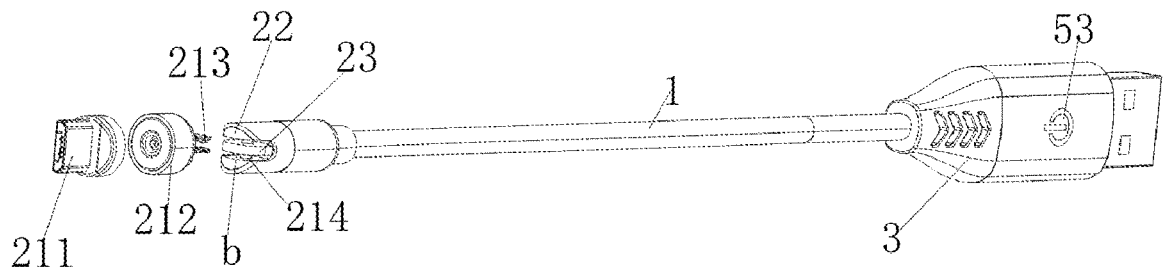
FIG. 9 is an explosion schematic diagram of the external connector of FIG. 7.
Figure 10:
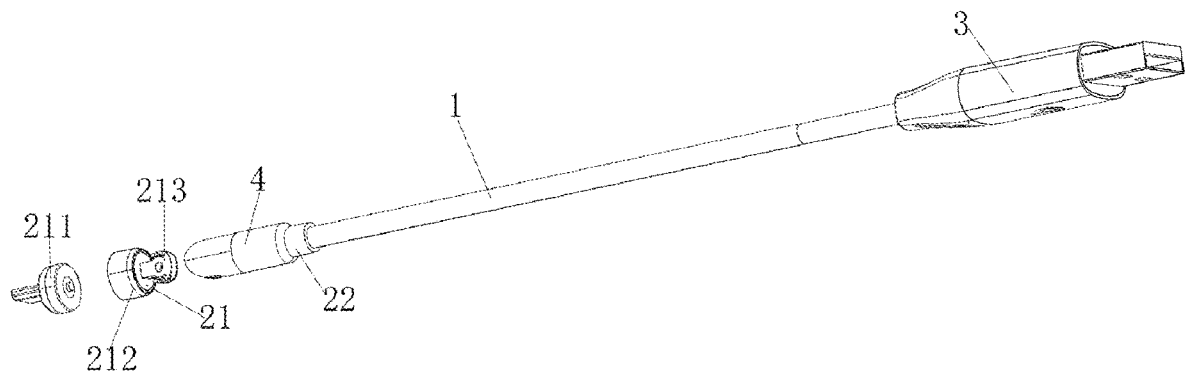
FIG. 10 is an explosion schematic diagram of another direction of the external connector of FIG. 7.
Figure 11:
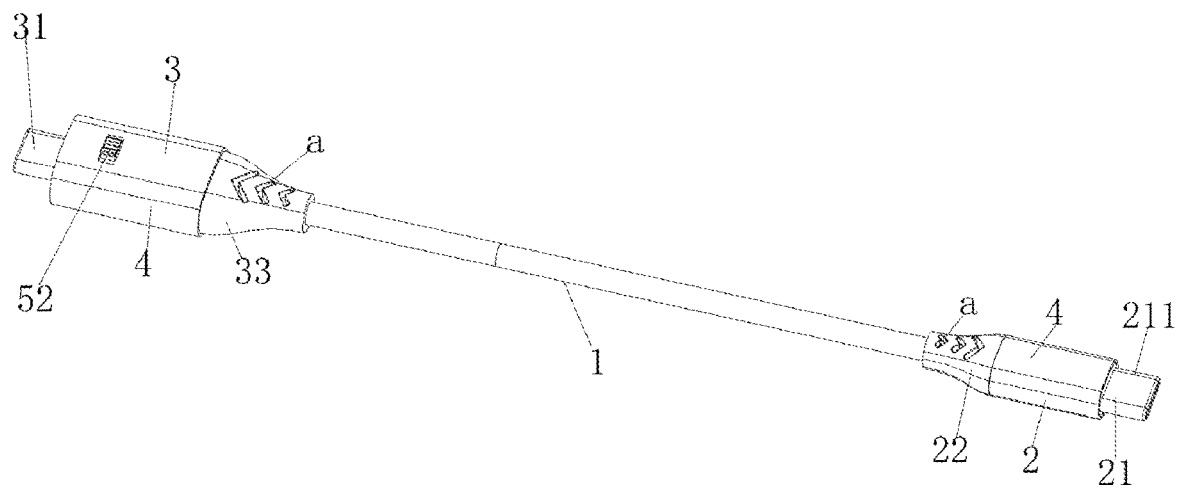
FIG. 11 is a schematic structural diagram of the USB interface and the external connector being Type-C and the control switch being a left and right toggle switch.
Figure 12:
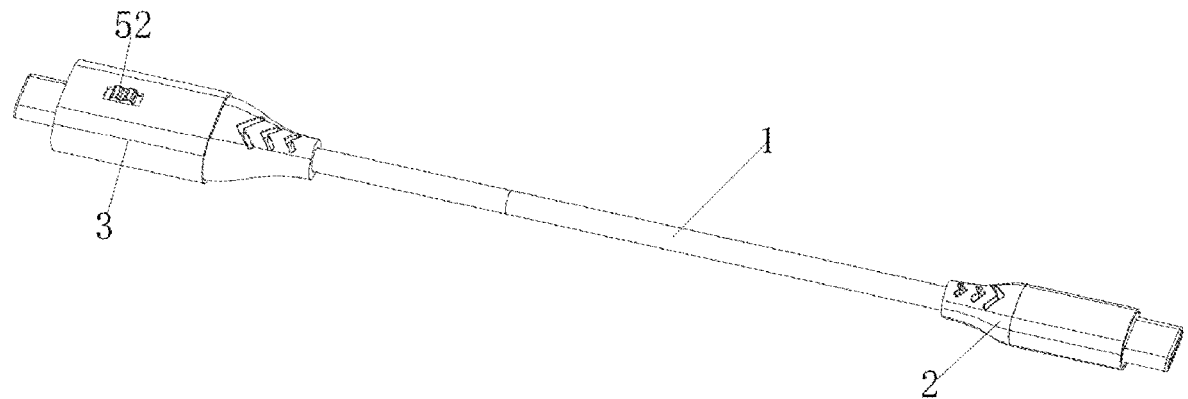
FIG. 12 is a schematic structural diagram of the control switch being an up and down toggle switch.

Preferably, as shown in FIGS. 3 and 6, to ensure the compactness of the power connector 3 and the aesthetics of the data cable, three LED lamp beads 34 are provided, and the three LED lamp beads 34 are arranged in parallel on one end of the first circuit board 32 far from the USB interface 31; the lampshade 35 is provided with one, and the lampshade 35 is provided with three light-shielding grooves that are compatible with the LED lamp beads 34 in parallel; three transparent optical fibers 11 are provided, and the three transparent optical fibers 11 are helically wound to each other in the wire sleeve 12 with the signal and power line. In some embodiments, the same light emitted by the three LED lamp beads 34 is of the same color, and the light emitted by the three LED lamp beads 34 is all red. The light emitted by the beads 34 is all green, and the wire sleeve 12 is a green transparent plastic cover at this time, and the light emitted by the three LED lamp beads 34 is all blue, and the wire sleeve 12 is a blue transparent plastic cover at this time. In some embodiments, the three LED lamp beads 34 emit different lights. The light emitted by the three LED lamp beads 34 is respectively red, purple, green, or red, blue, green, or blue, green, and purple. At this time, the wire sleeve 12 is a colorless transparent rubber sleeve.

Preferably, as shown in FIG. 1, an anti-shrinkage structure a is provided on the first casing 33 near the end of the data cable body 1 to prevent the first casing 33 from shrinking and causing the first casing 33 to loosen from the data cable main body 1. The anti-shrinkage structure a is a plurality of through holes and/or grooves disposed on the upper and lower sides of the first casing 33 close to one end of the data cable main body 1. The through-holes and/or grooves may be fish-shaped, crescent-shaped or <-shaped. The through holes and/or grooves on the upper and lower sides of the first casing 33 are symmetrically arranged. In this embodiment, preferably, in order to increase the aesthetics of the charging cable, the first casing 33 is covered with an aluminum casing 4. The color of the outer surface of the aluminum casing 4 is similar to the color of the wire sleeve 12. Several through holes and/or grooves are combined with the aluminum casing 4 to form a 1-character distribution, and 3, 4 or 5 grooves and/or through holes are arranged side by side on the upper and lower sides of the first casing 33. The anti-shrinkage structure a on the first casing 33 located on the upper and lower sides of one end of the data cable main body 1 can effectively prevent the first casing 33 and the data cable main body 1 from loosening due to the shrinkage of the first casing 33 during use.

Preferably, as shown in FIG. 2, a single-chip microcomputer is arranged on the first circuit board 32, and the control switch 5, the USB interface 31, the LED lamp beads 34, and the signal and power line are all electrically connected to the single-chip microcomputer through the first circuit board 32. The microcontroller can control the three LED lamp beads 34 to turn on and off in turn according to the number of pressings of the control switch 5, or control the three LED lamp beads 34 to flash at the same time, or control the three LED lamp beads 34 to be always on, or control the three LED lamp beads 34 to be in an off state, thereby embodying the beauty and fun of the charging cable. As shown in FIGS. 7, 8, 11 and 12, in this embodiment, at least one control switch 5 is provided, and the control switch 5 may be a touch switch 51, a touch switch 53 or a toggle switch 52. The single-chip microcomputer is FC154 in the prior art. FC154 is a low power consumption, high speed, high noise tolerance, EPROM/ROM based on 8-bit CMOS process single-chip microcomputer, using RISC instruction set, a total of 42 instructions, except the branch instruction is a two-cycle instruction, the rest are single-cycle instruction.

Preferably, in order to further improve the search for the data connector 2 in a dark environment, as shown in FIGS. 1, 2, 4, and 5, the data connector 2 includes: a light-transmitting second casing 22, a second circuit board 23 and an external connector 21. The second circuit board 23 is arranged in the second casing 22 and is electrically connected to the end of the signal and power line away from the power connector 3; the external connector 21 is electrically connected to the second circuit board 23. A display light electrically connected to the second circuit board 23 is disposed in the second casing 22. The display light is connected to the power cord, and the first casing 33 and the second casing 22 are both made of light-transmitting insulating plastic. In this embodiment, the light emitted by the display light can be blue, yellow, or purple. In this embodiment, the two ends of the wire sleeve 12 are respectively fixed to the first casing 33 and the second casing 22 by injection molding, thereby preventing the falling off between the casing and the wire. In some embodiments, the upper and lower sides of the second casing 22 located at one end of the data cable main body 1 are provided with the effect of preventing the second casing 22 from shrinking and causing the second casing 22 to loosen from the data cable main body 1.

In some embodiments, as shown in FIGS. 7-10, in order to facilitate the replacement of the USB connector 211, one end of the second casing 22 is provided with a slot b, and a part of the second circuit board 23 is exposed in the slot b. Two metal conductive sheets correspondingly and electrically connected to the second circuit board 23 are provided on two sides of the part of the second circuit board 23 that is exposed in the slot b, and the external connector 21 is rotatably disposed inside the slot b through an insulated rotating shaft 214, two conductive elastic sheets 213 abutting against the two metal conductive sheets respectively and rotatably disposed on the rotating shaft 214 are disposed on the external connector 21, and the external connector 21 includes: a conductive connector 212 and a USB connector 211, wherein the conductive connector 212 is electrically connected to one end of each of the two conductive elastic sheets 213, and the USB connector 211 magnetically and electrically connected to the conductive connector 212 is used for plugging with a device charging port.

In some embodiments, the external connector 21 is a USB connector 211, and the external connector 21 and the second casing 22 form a 1-shape or a 7-shape. It should be noted that the USB connector 211 is a Micro USB, Type-C or Lightning connector. The USB interface 31 can be a USB or Type-C connector. Preferably, in order to increase the aesthetics of the charging cable, the second casing 22 is covered with an aluminum casing 4. The color of the outer surface of the aluminum casing 4 is similar to the color of the wire sleeve 12.

The above is only used to illustrate the technical solution of the present disclosure and not to limit it. Other modifications or equivalent replacements made by those of ordinary skill in the art to the technical solution of the present disclosure, as long as they do not depart from the spirit and scope of the technical solution of the present invention, should be included in the within the scope of the claims of the present disclosure.

What is claimed is:

1. A charging cable, including: a data cable main body (1), a data connector (2) and a power connector (3) respectively disposed at two ends of the data cable main body (1), wherein the data cable main body (1) includes: a wire sleeve (12) and a signal and power line of which two ends are electrically and respectively connected to the data connector (2) and the power connector (3), wherein the power connector (3) includes a USB interface (31), a first circuit board (32) and a first casing (33), the signal and power line is electrically connected to the USB interface (31) through the first circuit board (32), and wherein the first casing (33) is a light-transmitting casing, the wire sleeve (12) is a transparent wire sleeve, and the charging cable further includes: at least one LED lamp bead (34) disposed in the first casing (33) and electrically connected to the first circuit board (32);

at least one lampshade (35) that is opaque, being sleeved on an outer side wall of the LED lamp bead (34) and located in the first casing (33);

a transparent optical fiber (11), one end of which passes through the lampshade (35) and is butted with the LED lamp bead (34), wherein the transparent optical fiber (11) is disposed in the wire sleeve (12) and extends from one end of the wire sleeve (12) to another end of the wire sleeve (12); and a control switch (5) for controlling the LED lamp bead (34), the control switch (5) passing through one side of the first casing (33) and being electrically connected to the first circuit board (32);

wherein a number of the LED lamp beads (34) is three, and the three LED lamp beads (34) are disposed in parallel on one end of the first circuit board (32) away from the USB interface (31); a number of the lampshade (35) is one, and three light-shielding grooves each adapted to the LED lamp bead (34) are disposed in parallel on the lampshade (35); a number of the transparent optical fibers (11) is three, and the three transparent optical fibers (11) and the signal and power line are helically wound to each other in the wire sleeve (12).

2. The charging cable according to claim 1, wherein the three LED lamp beads (34) emit same light and have a same color, or the three LED lamp beads (34) emit different light.

3. The charging cable according to claim 1, wherein an anti-shrinkage structure (a) is disposed on one end of the first casing (33) close to the data cable main body (1) for preventing the first casing (33) from shrinking and causing the first casing (33) to loosen from the data cable main body (1).

4. The charging cable according to claim 3, wherein the anti-shrinkage structure (a) has a plurality of through holes and/or grooves disposed on upper and lower sides of the one end of the first casing (33) close to the data line body (1).

5. The charging cable according to claim 1, wherein the data connector (2) includes: a second casing (22) that is light-transmitting;

a second circuit board (23) disposed in the second casing (22) and electrically connected to an end of the signal and power line away from the power connector (3); and an external connector (21) electrically connected to the second circuit board (23).

6. The charging cable according to claim 5, wherein one end of the second casing (22) is provided with a slot (b), a part of the second circuit board (23) is exposed in the slot (b), and two metal conductive sheets correspondingly and electrically connected to the second circuit board (23) are respectively provided on two sides of the part of the second circuit board (23) that is exposed in the slot (b); wherein the external connector (21) is rotatably disposed inside the slot (b) through an insulated rotating shaft (214), two conductive elastic sheets (213) respectively abutting against the two metal conductive sheets and rotatably disposed on the rotating shaft (214) are disposed on the external connector (21); wherein the external connector (21) includes: a conductive connector (212) and a USB connector (211), the conductive connector (212) is electrically connected to one end of each of the two conductive elastic sheets (213), and the USB connector (211) magnetically and electrically connected to the conductive connector (212) is used for plugging with a device charging port.

7. The charging cable according to claim 5, wherein the external connector (21) is a USB connector (211), and the external connector (21) and the second casing (22) form a 1-shape or a 7-shape.

8. The charging cable according to claim 5, wherein each of the first casing (33) and the second casing (22) is sleeved with an aluminum casing (4), and the control switch (5) is a touch switch (51), a touch switch (53) or a toggle switch (52).

9. The charging cable according to claim 5, wherein a display light electrically connected to the second circuit board (23) is disposed in the second casing (22).

10. The charging cable according to claim 9, wherein one end of the second casing (22) is provided with a slot (b), a part of the second circuit board (23) is exposed in the slot (b), and two metal conductive sheets correspondingly and electrically connected to the second circuit board (23) are respectively provided on two sides of the part of the second circuit board (23) that is exposed in the slot (b); wherein the external connector (21) is rotatably disposed inside the slot (b) through an insulated rotating shaft (214), two conductive elastic sheets (213) respectively abutting against the two metal conductive sheets and rotatably disposed on the rotating shaft (214) are disposed on the external connector (21); wherein the external connector (21) includes: a conductive connector (212) and a USB connector (211), the conductive connector (212) is electrically connected to one end of each of the two conductive elastic sheets (213), and the USB connector (211) magnetically and electrically connected to the conductive connector (212) is used for plugging with a device charging port.

11. The charging cable according to claim 9, wherein the external connector (21) is a USB connector (211), and the external connector (21) and the second casing (22) form a 1-shape or a 7-shape.

\* \* \* \* \*